(12) United States Patent
Bidermann

(10) Patent No.: US 6,380,880 B1
(45) Date of Patent: Apr. 30, 2002

(54) DIGITAL PIXEL SENSOR WITH INTEGRATED CHARGE TRANSFER AMPLIFIER

(75) Inventor: William R. Bidermann, Mountain View, CA (US)

(73) Assignee: Pixim, Incorporated, Mountain View, CA (US)

( * ) Notice: Subject to any disclaimer, the term of this patent is extended or adjusted under 35 U.S.C. 154(b) by 0 days.

(21) Appl. No.: 09/823,592

(22) Filed: Mar. 30, 2001

(51) Int. Cl.[7] .................................................. H03M 1/56
(52) U.S. Cl. ........................................................ 341/155
(58) Field of Search ................................. 341/155, 169, 341/156

(56) References Cited

U.S. PATENT DOCUMENTS

| | | | |
|---|---|---|---|
| 3,623,132 A | 11/1971 | Green | 307/205 |
| 4,142,199 A | 2/1979 | Simi et al. | 357/24 |
| 5,461,425 A | 10/1995 | Fowler et al. | 348/294 |
| 5,471,515 A | 11/1995 | Fossum et al. | 377/60 |
| 5,801,657 A | 9/1998 | Fowler et al. | 341/155 |
| 5,982,318 A | * 11/1999 | Yiannoulos | 341/155 |
| 6,271,785 B1 | * 8/2001 | Martin | 341/156 |

* cited by examiner

*Primary Examiner*—Brian Young
(74) *Attorney, Agent, or Firm*—Skjerven Morrill MacPherson LLP; Carmen C. Cook

(57) ABSTRACT

A digital image sensor includes a sensor array of digital pixels which output digital signals as pixel data. Each of the digital pixels includes a photodetector producing an analog signal indicative of the amount of light impinging on the sensor array and a charge transfer amplifier coupled to receive the analog signal and generate an amplified pixel voltage signal. The digital image sensor further includes analog-to-digital conversion (ADC) circuits located within the sensor array. Each of the ADC circuits is connected to one or more charge transfer amplifiers of the digital pixels for converting the amplified pixel voltage signal of each digital pixel to a digitized pixel voltage signal. The charge transfer amplifier operates to increase the sensitivity of the digital image sensor. The charge transfer amplifier can be implemented as a transfer gate with a floating diffusion as a measuring capacitor.

16 Claims, 8 Drawing Sheets

DIGITAL PIXEL SENSOR WITH INTEGRATED CHARGE TRANSFER AMPLIFIER

FIELD OF THE INVENTION

The invention generally relates to image sensor systems; and in particular, the present invention relates to a digital image sensor including an integrated charge transfer amplifier at each pixel.

BACKGROUND OF THE INVENTION

Digital photography is one of the most exciting technologies that have emerged in the past years. With the appropriate hardware and software (and a little knowledge), anyone can put the principles of digital photography to work. Digital cameras, for example, are on the cutting edge of digital photography. Recent product introductions, technological advancements, and price cuts, along with the emergence of email and the World Wide Web, have helped make digital cameras the hottest new category of consumer electronics products.

Digital cameras, however, do not work in the way that traditional film cameras do. In fact, they are more closely related to computer scanners, copiers, or fax machines. Most digital cameras use an image sensor or photosensitive device, such as charged-coupled device (CCD) or Complementary Metal-Oxide Semiconductor (CMOS) to sense a scene. The photosensitive device reacts to light reflected from the scene and can translate the strength of that light into electronic signals that are digitized. By passing light through red, green, and blue filters, for example, the intensity of the light can be gauged for each separate color spectrum. When the readings are combined and evaluated via software, the camera can determine the specific color of each segment of the picture. Because the image is actually a collection of numeric data, it can easily be downloaded into a computer and manipulated for more artistic effects.

Digital cameras, however, do not have the resolution attainable with conventional photography. While traditional film-based technology, limited only by the granularity of the chemically based film, typically has a resolution of tens of millions of pixels, image sensors for use in most commercially available digital cameras acceptable to general consumers have a resolution of slightly more than one or two million pixels. Although digital cameras having resolutions of up to six million pixels are available, these high-resolution cameras are prohibitively expensive. Furthermore, the dynamic range of digital image sensors is often not as broad as is possible with film-based conventional photography. This is especially true for CMOS image sensors which, in general, have lower dynamic ranges than CCDs.

FIG. 1 is a block diagram of a digital image sensor as disclosed in U.S. Pat. No. 5,461,425 of Fowler et al. ("the '425 patent"). As is shown, digital image sensor 10 includes an image sensor core 12 which has a two-dimensional array of pixels. Each pixel 15 of sensor core 12 has a light detecting element (a photodetector or photosensor) coupled to a dedicated A/D converter. Each of the A/D converter outputs a stream of bits representative of the analog output of the associated light detecting element. In other words, the image sensor of the '425 patent outputs digital image data directly from each pixel. In a digital image sensor such as sensor 10 of FIG. 1, not only does the supporting circuitry for image sensor core 12 become dramatically simplified, there are also numerous advantages provided by the digital image sensor architecture in view of traditional CMOS image sensors. The advantages include better control of operations of the image sensor and far better image quality therefrom.

However, adding a dedicated A/D converter to each of the light detecting elements could introduce some practical problems that may limit the practical application of such digital image sensors. One of the problems is that image sensor core 12 is inevitably larger than it would be without the dedicated A/D converters. If an image sensor is desired to have millions of photodetectors thereon, there would be a large number of dedicated A/D converters, which could take a significant amount of circuit area to implement in the image sensor core. Larger image sensor cores are undesirable because they typically lead to higher manufacturing cost and lower yield. Therefore, designs of digital image sensors having a smaller image sensor core are much more desirable. Further, it is often not feasible to merely reduce the size of the photodetectors to accommodate the dedicated A/D converters in an image sensor of limited size. This is because the sensitivity of the photodetectors could be compromised when the photodetectors are made smaller. This decreased sensitivity leads to a corresponding decrease in the dynamic ranges of the pixels. Therefore, there is a need to improve the sensitivity and dynamic range of a CMOS image sensor while maintaining small device sizes of the image sensor core.

SUMMARY OF THE INVENTION

According to the present invention, a digital image sensor includes a sensor array of digital pixels. The sensor array outputs digital signals as pixel data representing an image of a scene. Each of the digital pixels includes a photodetector producing an analog signal indicative of the amount of light impinging on the sensor array. Each digital pixel also includes a charge transfer amplifier coupled to receive the analog signal and amplifying the signal to generate an amplified pixel voltage signal. The digital image sensor further includes analog-to-digital conversion (ADC) circuits located within the sensor array. Each of the ADC circuits is connected to one or more charge transfer amplifiers for converting the amplified pixel voltage signal of each digital pixel to a digitized pixel voltage signal. The sensor array of the present invention is fabricated in an integrated circuit.

The charge transfer amplifier generates a pixel voltage signal having increased voltage magnitude than the voltage signal generated by the photodetector and provides the enhanced voltage value to the analog-to-digital conversion circuit. The integration of a charge transfer amplifier in a digital pixel of the present invention has the effect of increasing the sensitivity level of each of the digital pixels and as a result, provides a digital image sensor with increased sensitivity and dynamic range.

In one embodiment, the photodetector is a photogate and the charge transfer amplifier is implemented as a transfer gate and a floating diffusion as a measuring capacitor.

The present invention is better understood upon consideration of the detailed description below and the accompanying drawings.

BRIEF DESCRIPTION OF THE DRAWINGS

In the present disclosure, like objects which appear in more than one figure are provided with like reference numerals.

DETAILED DESCRIPTION OF THE PREFERRED EMBODIMENTS

According to the present invention, a digital image sensor, implementing a digital pixel sensor (DPS) architecture, includes a charge transfer amplifier within each digital pixel for enhancing the sensitivity of the image sensor. The increased sensitivity of the digital pixels allows the pixels to capture light information even in low light conditions or when the integration times are short. Thus, the digital image sensor of the present invention has applicability in low light imaging conditions or in motion photography, such as sports photography.

Figure 1:
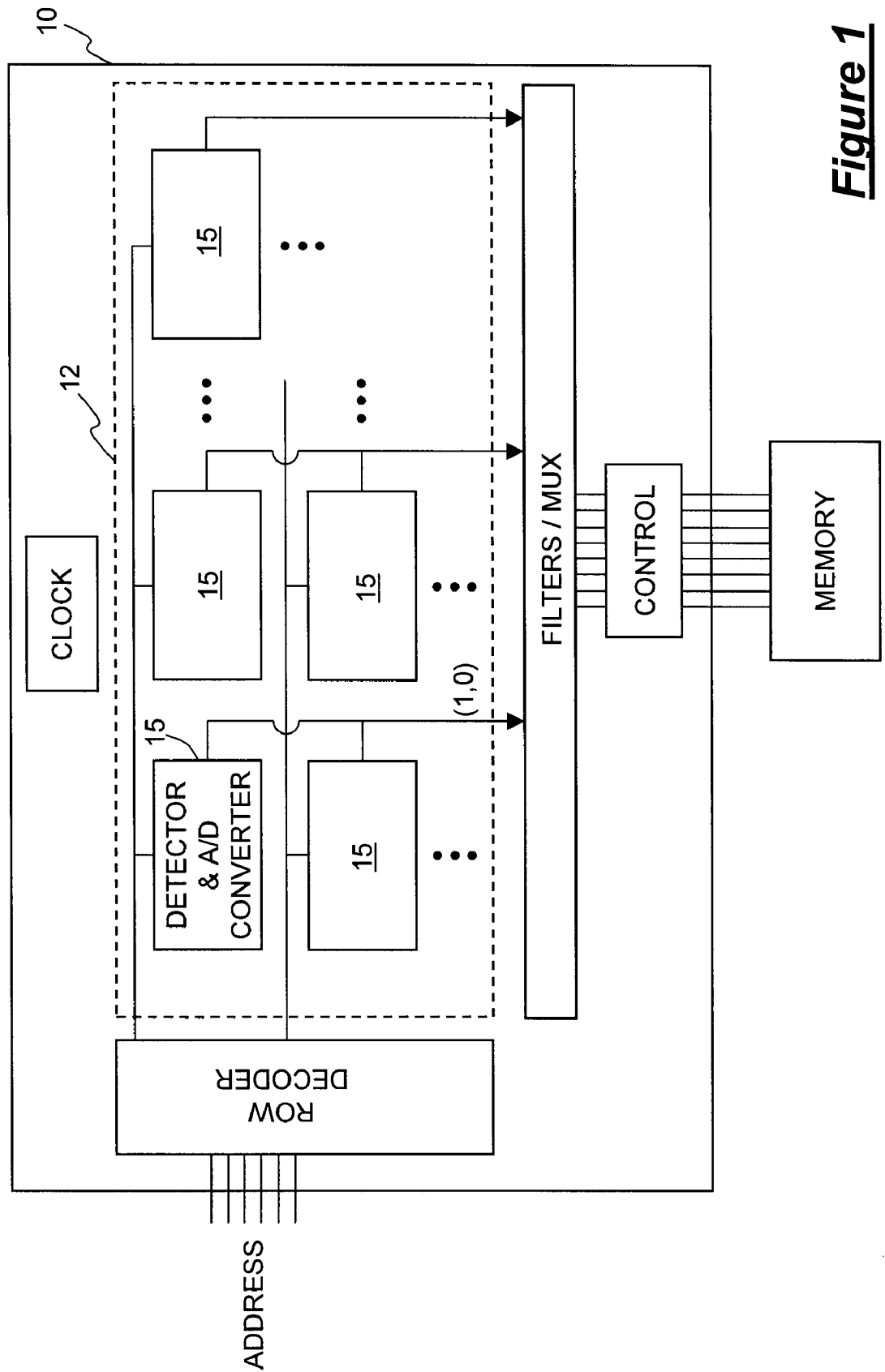
FIG. 1 is a block diagram of a digital image sensor as described in U.S. Pat. No. 5,461,425 of Fowler et al.

In the present description, a digital pixel sensor (DPS) array or a sensor array refers to a digital image sensor having an array of photodetectors where each photodetector produces a digital output signal. In one embodiment of the present invention, the DPS array implements the digital pixel sensor architecture illustrated in FIG. 1 and described in aforementioned '425 patent which patent is incorporated herein by reference in its entirety. The DPS array of the '425 patent utilizes pixel level analog-to-digital conversion to provide a digital output signal at each pixel. The pixels of a DPS array are sometimes referred to as a "sensor pixel" or a "sensor element" or a "digital pixel," which terms are used to indicate that each of the photodetectors of a DPS array includes an analog-to-digital conversion (ADC) circuit, and is distinguishable from a conventional photodetector which includes a photodetector and produces an analog signal. The digital output signals of a DPS array have advantages over the conventional analog signals in that the digital signals can be read out at a much higher speed. Of course, other schemes for implementing a pixel level A/D conversion in an area image sensor may also be used in the image sensor of the present invention.

Figure 2:
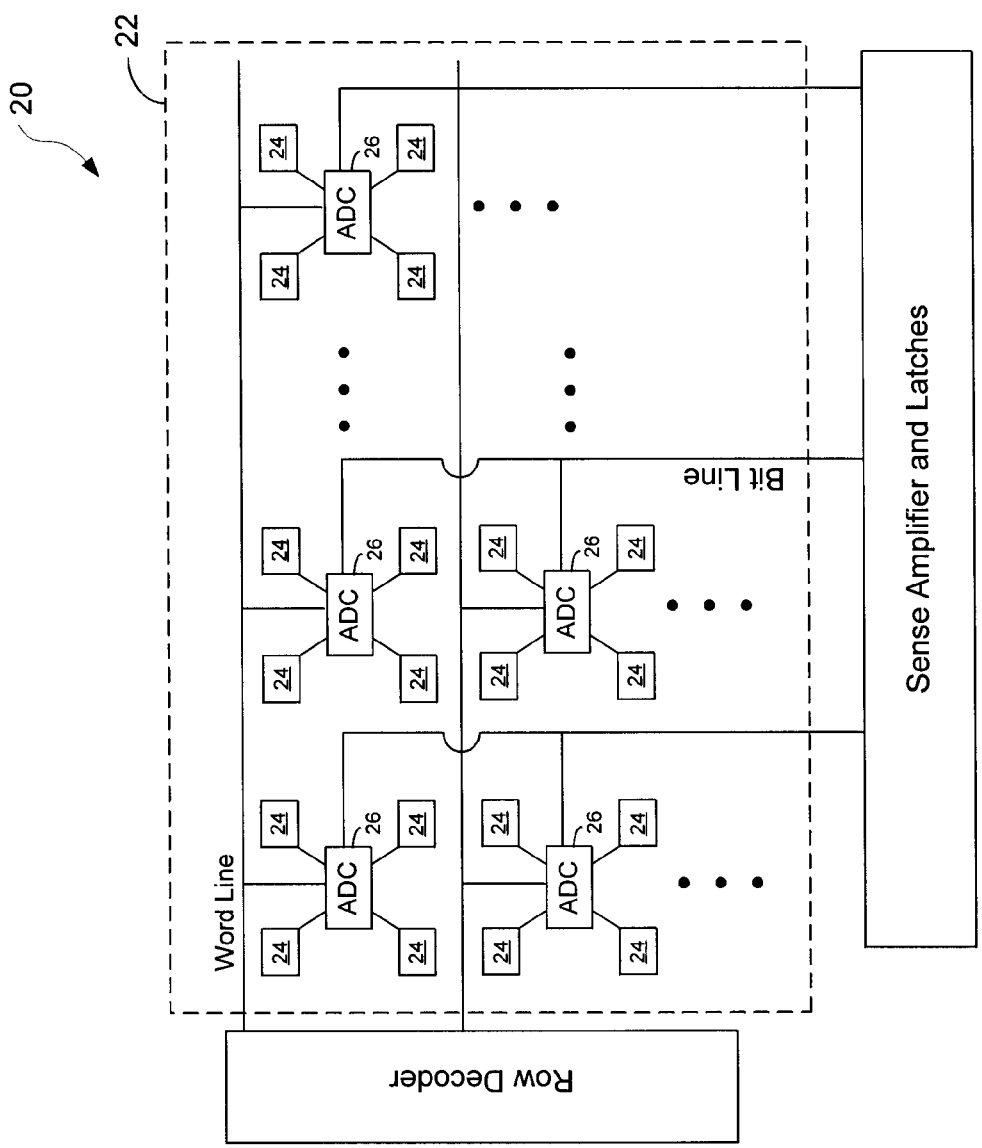
FIG. 2 is a block diagram of a digital image sensor where an ADC circuit is associated with four photodetectors in the image sensor array according to one embodiment of the present invention.

According to another embodiment of the present invention, the DPS array of the digital pixel sensor is implemented using the alternative array architecture illustrated in FIG. 2. In digital image sensor 20 of FIG. 2, sensor array 22 includes a two-dimensional array of photodetectors 24. Instead of providing a dedicated ADC circuit to each photodetector, an ADC circuit 26 of sensor array 22 is shared among a group of four neighboring photodetectors 24. Each of the ADC circuit 26 performs A/D conversion of the output voltage signal by multiplexing between the four neighboring photodetectors. Although the image capture time becomes four times longer in the shared-ADC architecture of FIG. 2 than the dedicated-ADC architecture of FIG. 1, the shared-ADC architecture of FIG. 2 has the advantage of retaining all of the benefit of pixel level analog-to-digital conversion while using a much smaller circuit area, reducing manufacturing cost and improving yield. Of course, other photodetector-to-ADC circuit ratios can be used depending on layout design choice and speed considerations. Digital image sensor 20 may include other control circuitry such as a clock generation circuit and other global control circuitry which are not shown in FIG. 2.

Figure 3:
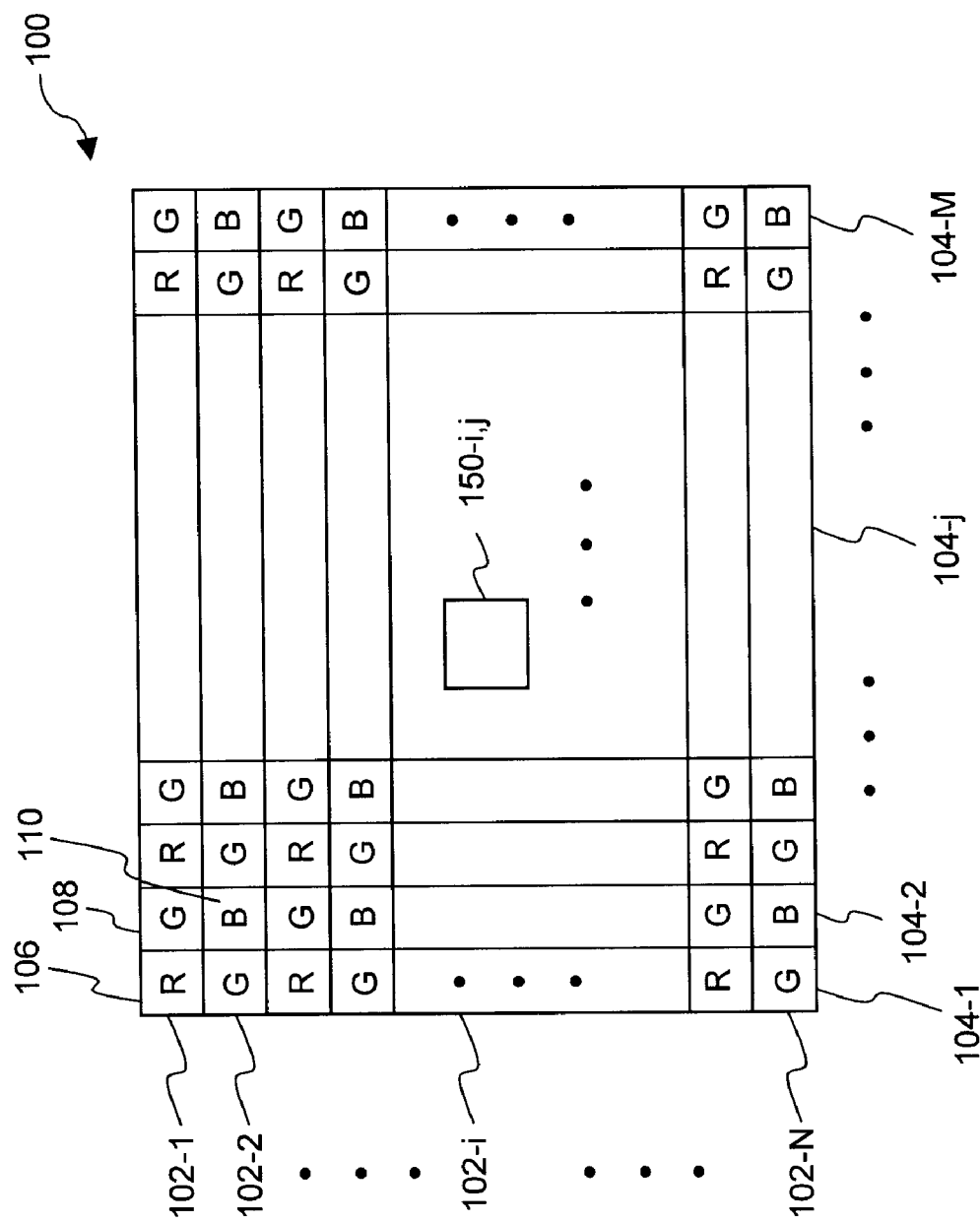
FIG. 3 is a block diagram of a CMOS image sensor array according to one embodiment of the present invention.

FIG. 3 illustrates a sensor array 100 in which the present invention may be practiced. Sensor array 100 can be used in any image capturing device (for example, a digital camera) for either stationary or video image capture. Sensor array 100, which is typically at least partially fabricated on a substrate utilizing CMOS technology, comprises a plurality of digital pixels 150-$i,j$ arranged in an array. Hereinafter, pixel 105 is used to denote any one of pixels 150-$i,j$ in array 100. Referring to FIG. 3, an individual pixel 150 is arranged in row 102-$i$ and column 104-$j$ where row 102-$i$ is one of rows 102-$i$ through 102-N and column 104-$j$ is one of columns 104-1 through 104-M. For color detection, each pixel 150 can -include an optical filter (e.g., a red filter, a blue filter, or a green filter). Pixels 150-$i,j$ are then arranged in a mosaic of selectively transmissive filters so that different groups of pixels 150-$i,j$ detect light of different colors. For example, a first group 106 of pixels 150-$i,j$ can detect a red spectrum, a second group 108 of pixels 150-$i,j$ can detect a green spectrum, and a third group 110 of pixels 150-$i,j$ can detect a blue spectrum. The resolution of sensor array 100 is determined by the number of rows and columns. In FIG. 3, the resolution of sensor array 100 is N by M which, in many applications, can be 1000 pixels by 1000 pixels, for example. In the present embodiment, sensor array 100 is fabricated using CMOS technology. Of course, other fabrication technologies can be used, such a BiCMOS or an NMOS fabrication technology.

Each pixel 150 in sensor array 100 includes a photodetector (or a photosensor) that produces an electrical signal when exposed to light. Each pixel 150 or a group of pixels 105$i$–$j$ in sensor array 100 also includes an ADC circuit for generating the digital output signal of the pixel. When sensor array 100 is incorporated in a digital image sensor of the present invention, each pixel 150 also includes a charge transfer amplifier circuit for enhancing the sensitivity of the pixel.

Figure 4:
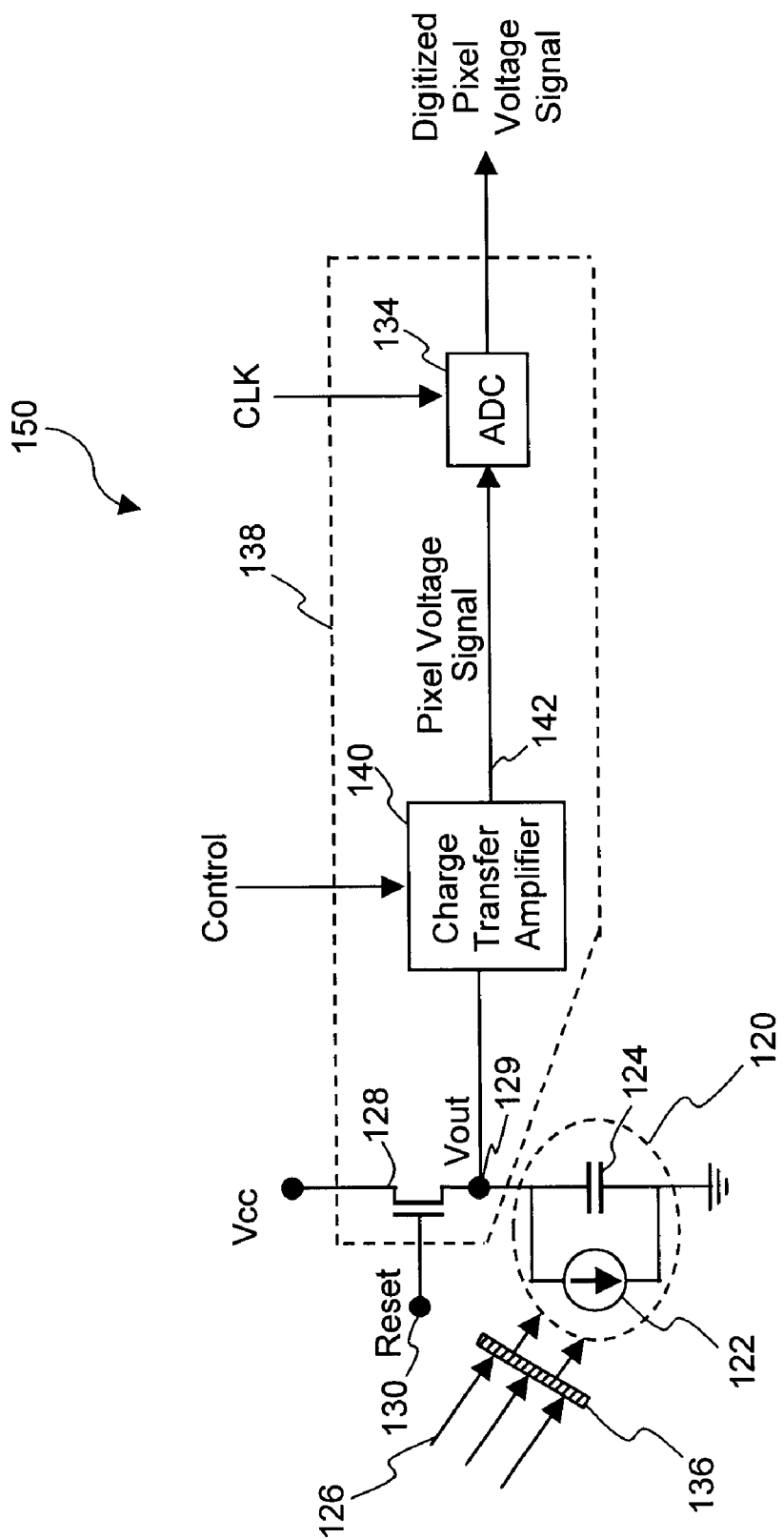
FIG. 4 is a circuit diagram of a single digital pixel in a sensor array according to one embodiment of the present invention.

FIG. 4 is a block diagram of a single digital pixel 150 in sensor array 100 according to one embodiment of the present invention. As mentioned above, digital pixel 150 can be any one of pixels 150-$i,j$ in sensor array 100. Referring to FIG. 4, digital pixel 150 includes a photodetector 120 and a readout circuit 138. Photodetector 120 can be a photogate, a photodiode or a phototransistor. In another embodiment, photodetector 120 is implemented as an enhanced photodetector described in copending and commonly assigned U.S. patent application Ser. No. 09/617,740, filed Jul. 17, 2000, entitled "Digital Pixel Sensor Readout With Modified Photo Detector," of David Yang et al., which patent is incorporated herein by reference in its entirety. In FIG. 4, photodetector 120 is modeled as a current source 122 connected in parallel with a capacitor 124. Photodetector 120 is connected in series with an NMOS transistor 128 and the serial combination of photodetector 120 and transistor 128 is coupled between a voltage $V_{cc}$ and ground. The gate terminal 130 of transistor 128 is coupled to receive a Reset signal. When the Reset signal to gate terminal 130 is set high, transistor 128 is turned on and capacitor 124 is charged to a voltage level equaling $V_{cc}$ less the threshold voltage of transistor 128, $V_{Th}$. After the Reset signal is set high long enough to charge capacitor 124, the Reset signal is set low to turn transistor 128 off. When photodetector 120 is exposed to light, capacitor 124 discharges through current source 122. In other embodiments of pixel 150, transistor 128 can be implemented as a PMOS transistor with the corresponding change in the polarity of the control signals.

When photodetector 120 is exposed to light, photons from incident light 126, filtered through a filter 136, impinge upon photodetector 120 and cause a change in the conductivity of the photodetector which is represented as a change in the current flow of current source 122. Current source 122 discharges capacitor 124 at a rate dependent on the number of photons striking photodetector 120. The voltage across capacitor 124 is thus dependent on the total number of photons striking photodetector 120. An output voltage signal $V_{out}$ generated at output node 129, which is the voltage across capacitor 124, is indicative of the integrated light intensity between the time that transistor 128 is turned off and the time that light 126 incident on photodetector 120 is turned off or the time the readout process begins. One of ordinary skill in the art would appreciate that in other implementations, transistor 128 can be used for other purposes such as blooming control or offset cancellations.

The operation of pixel 150 involves a light integration process followed by a readout process. Each of these two processes is sustained for a controlled time interval. First, capacitor 124 is charged by turning transistor 128 on. Then, in the light integration process as described above, light 126, incident on photodetector 120 for a predefined period of time (also called the exposure time) causes a change in the conductivity of photodetector 120. The time interval during which the light integration process proceeds is referred to as exposure control, which may be achieved by electronic or mechanical shuttering. The time interval controls how much charge is accumulated by photodetector 120.

After the light integration process, pixel 150 starts the readout process during which the output voltage $V_{out}$ generated by photodetector 120 is read out via readout circuit 138 to a data bus or video bus (not shown). In accordance with the present invention, in order to increase the sensitivity of photodetector 120, readout circuit 138 includes a charge transfer amplifier 140 coupled to output node 129 of photodetector 120. Charge transfer amplifier 140 operates to amplify the voltage level of the output voltage $V_{out}$ generated by the charge stored on capacitor 124 at the end of the integration period. Thus, charge transfer amplifier 140 provides a pixel voltage signal having an increased voltage magnitude at its output terminal 142 (also called a sensing node). In readout circuit 138, a control signal is coupled to charge transfer amplifier 140 for controlling the operation of the amplifier. The control signal can be a common signal driving the charge transfer amplifier circuits of pixels 105-$i,j$ in the entire sensor array 100. The control signal can also be a common signal driving a column or a row of pixels in sensor array 100.

The pixel voltage signal at sensing node 142 is coupled to an analog-to-digital conversion (ADC) circuit 134 which digitizes the analog pixel voltage signal to yield a digitized pixel voltage signal, indicative of the amount of light exposure of pixel 150. ADC circuit 134 can be implemented using any known A/D conversion technique and can have any degree of accuracy (e.g. 8, 10 or 16 bits or more).

ADC circuit 134 is controlled by a clock (CLK) signal and digitizes the analog pixel voltage signal when triggered by the CLK signal. The advantage of digitizing the pixel voltage signal within pixel 150, as opposed to using circuitry outside of pixel 150 as is conventionally accomplished, is that digitized pixel voltage signals can be converted and read out of each pixel 150 in sensor array 100 at a much higher speed than that of a corresponding analog signal. Further description of the pixel level digitalization in an image sensor can be found in the aforementioned '425 patent.

In one embodiment of the present invention, ADC circuit 134 is implemented using the Multi-Channel Bit Serial (MCBS) analog-to-digital conversion technique described in U.S. Pat. No. 5,801,657 of Fowler et al. ("the '657 patent"), which patent is incorporated herein by reference in its entirety. The MCBS ADC technique of the '657 patent can significantly improve the overall system performance while minimizing the size of the ADC circuit.

Furthermore, as described in the '657 patent, an MCBS ADC has many advantages applicable to image acquisition and more importantly, facilitates high-speed readout.

Figure 5:
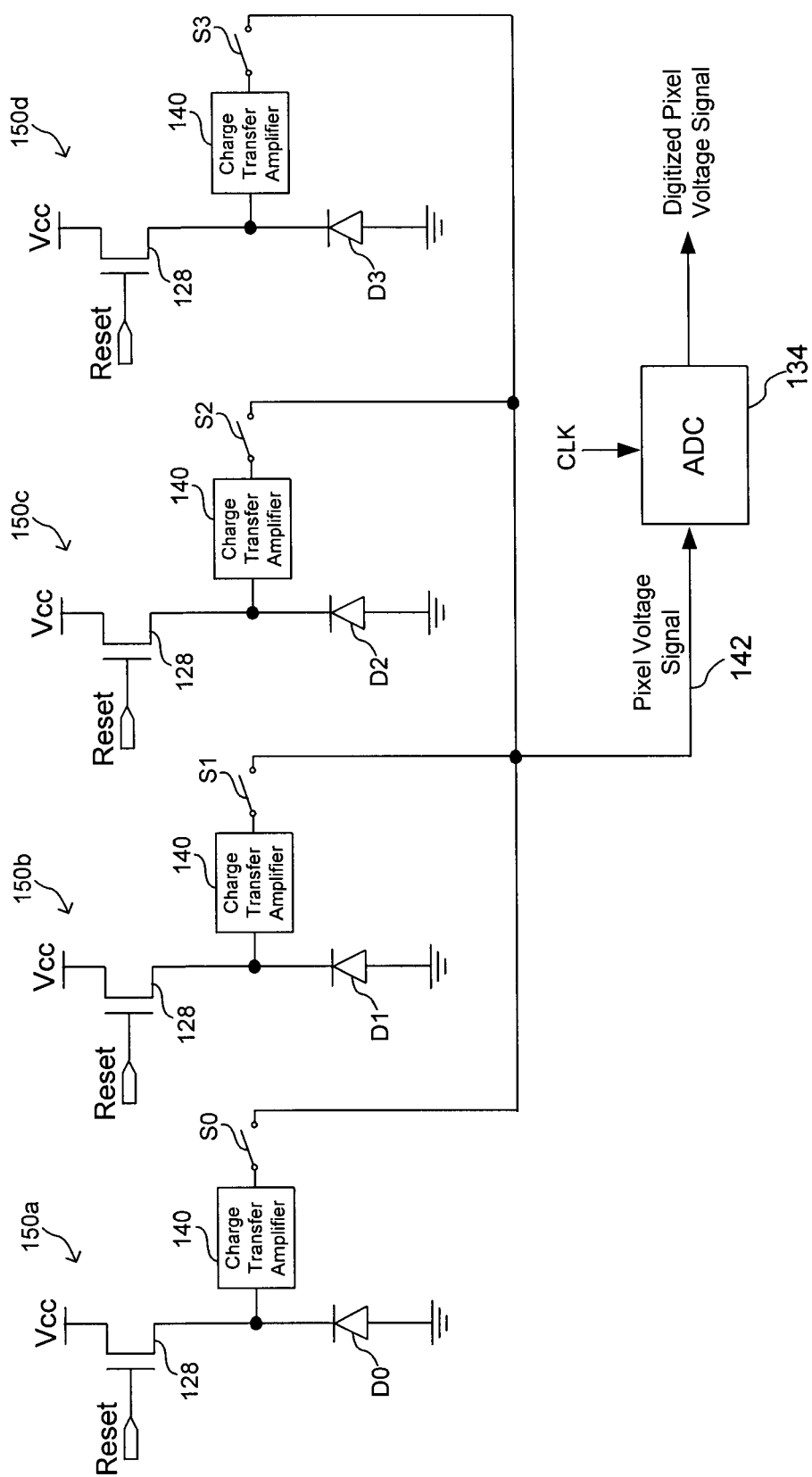
FIG. 5 is a circuit diagram of a group of four digital pixels in a sensor array sharing an ADC circuit according to one embodiment of the present invention.
Figure 8:
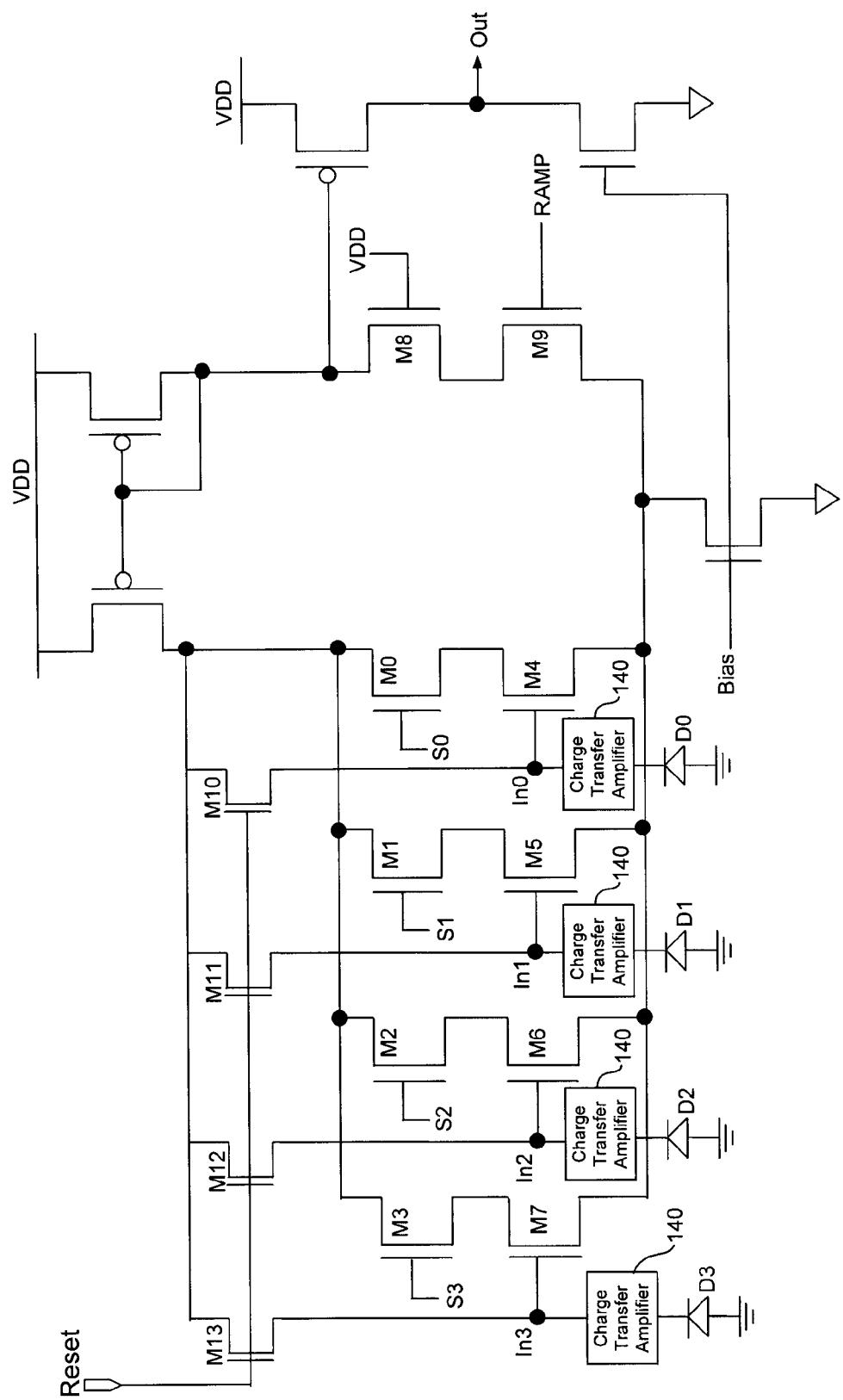
FIG. 8 is a circuit diagram of a group of four digital pixels in a sensor array sharing an ADC circuit according to another embodiment of the present invention.

The block diagram of FIG. 4 is used to illustrate one exemplary embodiment of pixel 150 of sensor array 100 of the present invention and is not intended to be limiting. Of course, other configurations of pixel 150 are possible for integrating light detection, charge transfer amplification and pixel-level A/D conversion within a pixel element. For example, while pixel 150 can be implemented using a dedicated ADC circuit 134 as shown in FIG. 4, a shared ADC sensor array architecture can also be used. FIG. 5 illustrates another embodiment of the present invention where a group of neighboring digital pixels 150$a$ to 150$d$ shares a single ADC circuit 134. Like elements in FIGS. 4 and 5 are given the same reference numeral to simplify the following description. In the embodiment shown in FIG. 5, digital pixels 150$a$ to 150$d$ include photodiodes D0 to D3 respectively as light detecting elements. Each of the photodiodes D0 to D3 is connected to an NMOS transistor 128 controlled by a Reset signal for resetting the photodiode between each light exposure. Transistor 128 and the Reset signal in each of digital pixels 150$a$ to 150$d$ operates in the same manner as previously described with respect to FIG. 4. Each of digital pixels 150$a$ to 150$d$ includes a charge transfer amplifier 140 for amplifying the output voltage generated by the respective photodiode. Each charge transfer amplifier 140 of pixels 150$a$ to 150$d$ provides a pixel voltage signal at its output. Switches S0 to S3 are disposed to multiplex ADC circuit 134 between pixels 150$a$ to 150$d$. Thus, at any one time, only one charge transfer amplifier 140 of pixels 150$a$ to 150$d$ is connected to sensing node 142 and provided to ADC circuit 134 for analog-to-digital conversion. Switches S0 to S3 in FIG. 5 are symbolic switches only and one of ordinary skill in the art would appreciate that switches S0 to S3 should be constructed such that, when the respective one of switches S0 to S3 are closed, the output node of each charge transfer amplifier 140 is isolated from the large capacitance of sensing node 142 in the shared-ADC architecture. For instance, a source follower can be used in switches S0 to S3 for capacitance isolation. In another embodiment, a shared-ADC architecture can be implemented using the mulitplexing scheme shown in FIG. 8 where switches S0 to S3 are incorporated in the comparator circuit of ADC circuit 134. Detail description of the comparator circuit in FIG. 8 is provided in concurrently filed and commonly assigned patent application Ser. No. 09/274,202, entitled "A Multiplexed Multi-Channel Bit Serial Analog-to-Digital Converter," of David Xiao Dong Yang et al. The advantage of the multiplexing scheme illustrated in FIG. 8 is that the output node of each charge transfer amplifier 140 drives the gate terminal of a transistor. Thus, the output node of each charge transfer amplifier 140 is isolated from the large capacitance resulted from sharing one ADC circuit with a multiple number of photodetectors. Of course, a person of ordinary skill in the art would appreciate that other methods of implementing a shared-ADC architecture can be used.

The advantage of integrating a charge transfer amplifier in a digital pixel of a digital image sensor includes improving the sensitivity of the digital pixel so that the digital pixel can have a much larger dynamic range as compared to a digital pixel without the use of charge transfer amplification. The increased sensitivity can be exploited by using multiple sampling to produce an image where both bright light and low light conditions can be captured with clarity. (Multiple sampling is described in more detail below.) A digital image sensor in accordance with the present invention is suitable for use in low-light photography where the amount of incident light is limited and conventional image sensors having limited sensitivity may not be able to capture any image at all. The digital image sensor of the present invention is also suitable for use in motion photography where the exposure time for each frame of an image is limited.

Furthermore, by providing amplification of the output voltage signal of the photodetector, the analog-to-digital conversion circuit associated with each digital pixel or a group of digital pixels can provide a more accurate A/D conversion. In a DPS architecture, each pixel incorporates a photodetector and an A/D conversion circuit or a group of pixels share an A/D conversion circuit. Because of space limitation, the pixel level A/D conversion circuit cannot be too large so as to increase the area of the image sensor core excessively. Typically, the A/D conversion circuit in a digital pixel sensor array is optimized for size and is thus generally less precise. By including charge transfer amplification in the digital pixel which typically requires a smaller area to implement, the digital image sensor of the present invention can tolerate a less precise A/D conversion while still producing satisfactory results. Another advantage of integrating charge transfer amplification in a digital pixel is that the area of the photodetector can be reduced if necessary to reduce the area of the image sensor core without sacrificing the sensitivity level of the digital pixel.

Another advantage of integrating a charge transfer amplifier in a digital pixel in the image sensor of the present invention is that the charge sensed by the photodetector is stored at the sense node of the charge transfer amplifier and is shielded from incident light. The aforementioned advantages of integrating a charge transfer amplifier in a digital pixel of a digital image sensor greatly improves the performance of the image sensor.

The charge any known charge transfer techniques such as using a charge-coupled device, a bucket brigade device or others. One of ordinary skilled in the art, upon being appraised of the present invention, would understand that any charge transfer amplifier implementations may be used in the digital image sensor of the present invention to achieve the result of improving the sensitivity of the image sensor.

Figure 6:
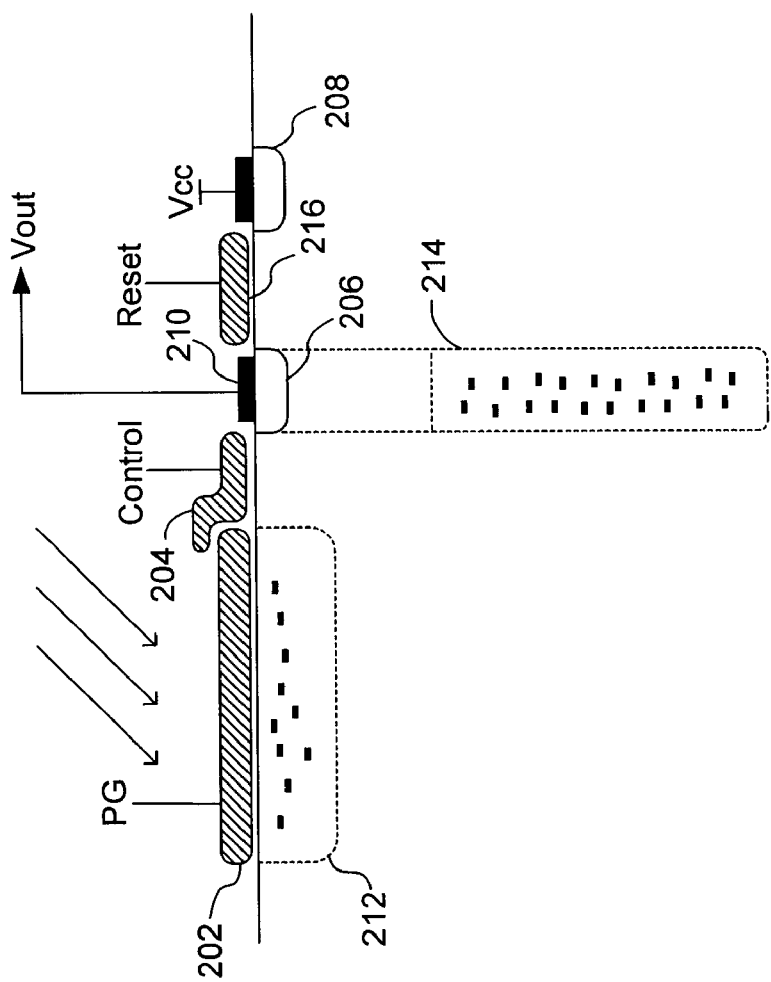
FIG. 6 is a cross-sectional schematic of a charge transfer amplifier implemented as a transfer gate and a measuring capacitor according to one embodiment of the present invention.

FIG. 6 illustrates a charge transfer amplifier implemented as a transfer gate and a measuring capacitor according to one embodiment of the present invention. In this embodiment, the photodetector is implemented as a photogate 202. Photogate 202 has a large gate area to enable accumulation of photo-generated charge in the substrate area 212 underneath photogate 202. A transfer gate 204 couples the substrate area 212 to a floating diffusion 206 which acts as a measuring capacitor. Floating diffusion 206 stores the photo-generated charge transferred from substrate area 212 and generates an output voltage $V_{out}$ at a node 210 (node 210 is used here to represent the electrical contact to floating diffusion 206). Floating diffusion 206 is typically a small diffusion area so that the measuring capacitor has a small capacitance. The capacitance of the measuring capacitor is much smaller than the capacitance of photogate 202. Dotted line 214 in FIG. 6 represents the potential well of floating diffusion 206 and is used to illustrate pictorially that the smaller capacitance of the measuring capacitor generates a larger output voltage $V_{out}$ for the same amount of charge collected by photogate 202. Specifically, the output voltage $V_{out}$ at node 210, which is the output node of the charge transfer amplifier (also called the sensing node) is given by:

$$V_{out} = \frac{C_{PG}}{C_M} V_{PG},$$

where $V_{out}$ is the voltage at sensing node 210, $C_{PG}$ is the capacitance of photogate 202, $C_M$ is the capacitance of the floating diffusion 206 and $V_{PG}$ is the voltage generated by photogate 202. When capacitance $C_M$ is much smaller than the capacitance of the photodetector, a large $V_{out}$ voltage can be generated at sensing node 210 by the action of the charge transfer amplifier. The use of a small capacitance measuring capacitor (floating diffusion 206) has the effect of increasing the sensitivity of photogate 202. A control signal is applied to transfer gate 204 to command the transfer of the charge accumulated by photogate 202 to floating diffusion 206. The control signal can be derived from the control signal PG of photogate 202 or the Reset signal of the photogate. Of course, in actual implementation, circuitry for initializing the voltages at sense node 210 and at transfer gate 204 is provided as is conventionally done. For example, in FIG. 6, the digital pixel further includes a Reset gate 216 coupled to a diffusion 208 area. Diffusion area 208 is coupled to the power supply $V_{cc}$ and functions to precharge floating diffusion 206 to a specified voltage when driven by the Reset signal.

Figure 7:
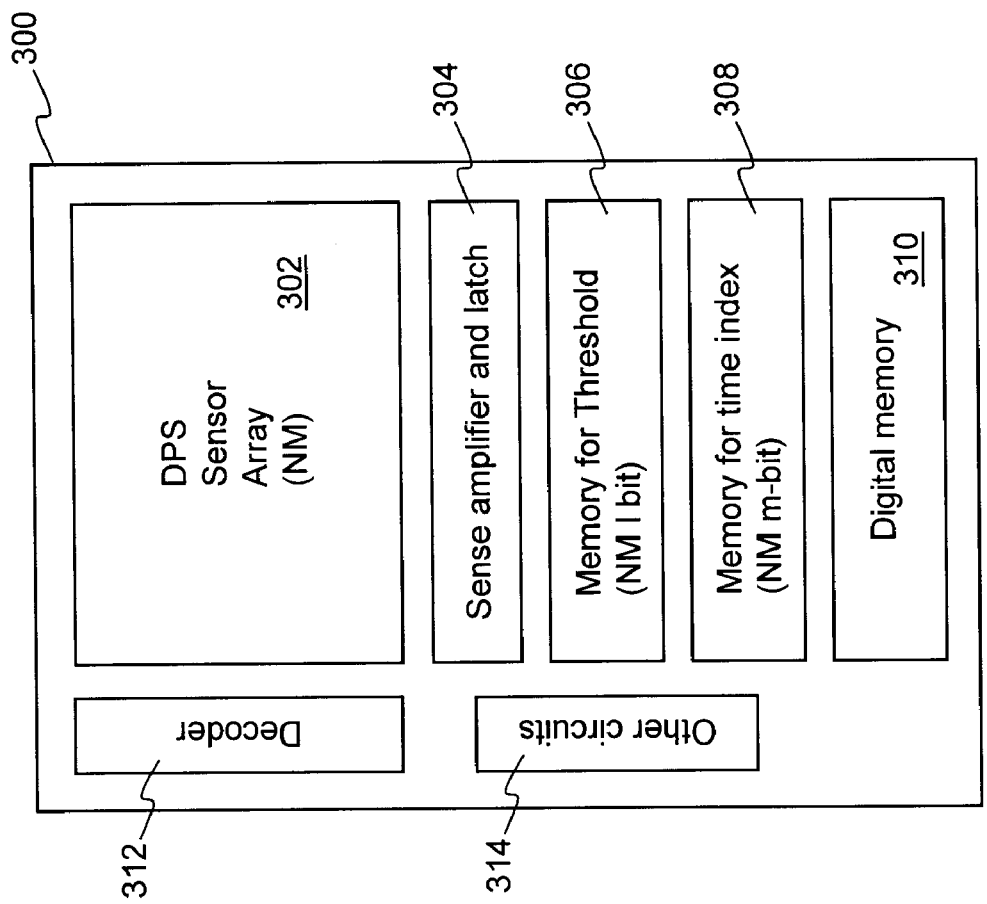
FIG. 7 is a block diagram of a digital image sensor incorporating the image sensor array according to one embodiment of the present invention.

In the present embodiment, sensor array 100, including within each pixel a charge transfer amplifier circuit, is fabricated on an integrated circuit using CMOS technology. Furthermore, sensor array 100 can be integrated with sensor supporting circuitry, such as row and column decoders and filters and multiplexer circuitry. In one embodiment, a digital image sensor of the present invention is implemented as described in the aforementioned '425 patent. In another embodiment, sensor array 100 can be integrated with supporting circuitry including a data memory, to form an integrated digital image sensor as illustrated in FIG. 7. FIG. 7 is a functional block diagram of an image sensor 300 according to the present invention. Image sensor 300 includes a sensor array 302 which has an N by M array of pixels similar to those described in FIGS. 2 and 3 above. Sensor array 302 includes digital pixels incorporating pixel-level charge transfer amplification. A sense amplifier and latch circuit 304 is coupled to sensor array 302 to facilitate the readout of digital signals from sensor array 302. A threshold memory 306, a time index memory 308, and digital memory 310 are coupled to sensor array 302. Since sensor array 302 is an N by M array of pixels where each pixel outputs a digitized pixel voltage signal having k bits, threshold memory 306 is N by M bits and the size of the time index memory 308 is N by M by m bits where m is the time index values. In one embodiment, the resolution of sensor array 302 is 1000 by 1000 pixels outputting 10 bits each (i.e., N=M=1000 and k=10). Therefore, threshold memory 306 is 1 megabits, time index memory 308 with two bit time index values is 2 megabits, and digital memory 310 is at least 10 megabits. As a result of this memory configuration, each pixel in sensor array 302 can be individually time-stamped by threshold memory 306 and time index memory 308 and stored in digital memory 310.

With the configuration outlined above and illustrated in FIG. 7, image sensor 300 can implement multiple sampling to improve the qualify of an image. In multiple sampling, each digital pixel can be exposed to an image for different exposure times in order to compensate for bright and dark portions of the image. Additionally, the information regarding how long an exposure time is associated with each pixel and the integrated intensity for that pixel is stored in time index memory 308 and digital memory 310. Further description of implementation of multiple sampling in image sensor 300 is provided in U.S. patent application Ser. No. 09/567,786, entitled "Multiple Sampling via a Time-Indexed Method to Achieve Wide Dynamic Ranges," by David Yang et al., filed on May 9, 2000, which is incorporated herein by reference in its entirety.

The above detailed descriptions are provided to illustrate specific embodiments of the present invention and are not intended to be limiting. Numerous modifications and variations within the scope of the present invention are possible. The present invention is defined by the appended claims.

I claim:

1. A digital image sensor, comprising:
    a sensor array of digital pixels, each of said digital pixels comprising:
        a photodetector producing an analog signal indicative of the amount of light impinging on said sensor array; and
        a charge transfer amplifier coupled to receive said analog signal and generating an amplified pixel voltage signal;
    a plurality of analog-to-digital conversion (ADC) circuits located within said sensor array, each of said ADC circuits being connected to one or more charge transfer amplifier of said digital pixels for converting said amplified pixel voltage signal of each digital pixel in said sensor array to a digitized pixel voltage signal;
    wherein said sensor array is fabricated in an integrated circuit.

2. The digital image sensor of claim 1, wherein said photodetector is a photogate and said charge transfer amplifier includes a transfer gate being controlled by a control signal and a floating diffusion having a capacitance much smaller than a capacitance of said photogate.

3. The digital image sensor of claim 1, further comprising:
    a data memory coupled to said sensor array, having a plurality of data memory cells, each data memory cell for storing said digital pixel voltage signal from each pixel in said sensor array of pixels.

4. The digital image sensor of claim 3, further comprising:
    a threshold memory coupled to said sensor array, having a plurality of threshold memory cells, each threshold memory cell for storing a threshold value for one of said digital pixels so that said digital pixel voltage signal in each of said data memory cells corresponds to said threshold value in a corresponding one of said threshold memory cells.

5. The digital image sensor of claim 4, further comprising:
    a time index memory coupled to said sensor array, for storing time index values for each of said digital pixels in said sensor array.

6. The digital image sensor of claim 1, wherein said integrated circuit is fabricated with a CMOS technology.

7. The digital image sensor of claim 1, wherein each ADC circuit in said sensor array is connected to one charge transfer amplifier of a digital pixel in said sensor array.

8. The digital image sensor of claim 1, wherein each ADC circuit in said sensor array is connected to at least four charge transfer amplifiers of four digital pixels in said sensor array, and said each ADC circuit multiplexes between said four charge transfer amplifiers for converting said amplified pixel voltage signal of each one of said four charge transfer amplifiers to said digital pixel voltage signal.

9. The digital image sensor of claim 8, wherein each ADC circuit includes a multiplexer coupled to select one of said amplified pixel voltage signals of said four charge transfer amplifiers, said multiplexer being incorporated in a comparator of said ADC circuit.

10. The digital image sensor of claim 9, wherein each of said amplified pixel voltage signals is coupled to a gate terminal of a transistor in an input signal path of said comparator.

11. The digital image sensor of claim 1, wherein each ADC circuit in said sensor array employs a Multi-Channel Bit Serial analog-to-digital conversion technique.

12. A method for generating electrical signals representing an optical image, comprising:
    generating an analog signal at a photodetector at each pixel location in a sensor array of photodetectors within a digital image sensor, said analog signal corresponding to a light intensity impinging on said pixel location;
    amplifying said analog signal at each pixel location; and
    converting said amplified analog signal to digital signals at each pixel location within said sensor array of photodetectors such that each pixel location provides digital output signals representing a level of said analog signal.

13. The method of claim 12, wherein said amplifying comprises:
    transferring electrical charge accumulated by said photodetector at each pixel location to a measuring node, said measuring node having a smaller capacitance value than a capacitance value of said photodetector.

14. The method of claim 12, wherein an analog-to-digital conversion circuit is located within each pixel location.

15. The method of claim 12, wherein an analog-to-digital conversion circuit is associated with a group of pixel locations, and said converting said amplified analog signal comprises:
    converting said amplified analog signal to digital signals at each pixel location of said group of pixel locations such that each pixel location provides digital output signals representing a level of said analog signal.

16. The method of claim 12, wherein said converting said amplified analog signal to digital signals at each pixel location uses a Multi-Channel Bit Serial analog-to-digital conversion technique.

* * * * *